No. 892,339. PATENTED JUNE 30, 1908.
C. P. WALLS.
TRAP NEST.
APPLICATION FILED APR. 4, 1907.
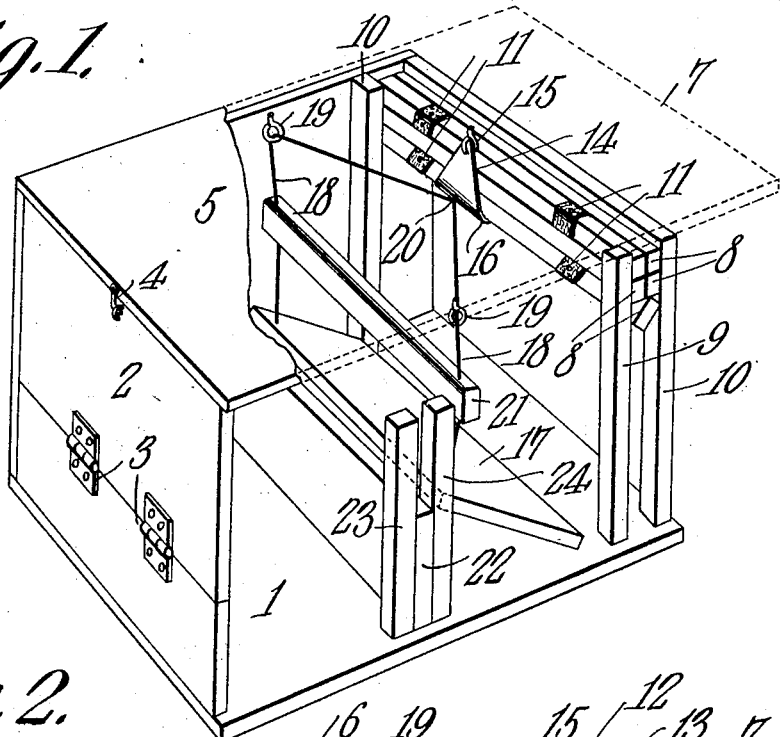
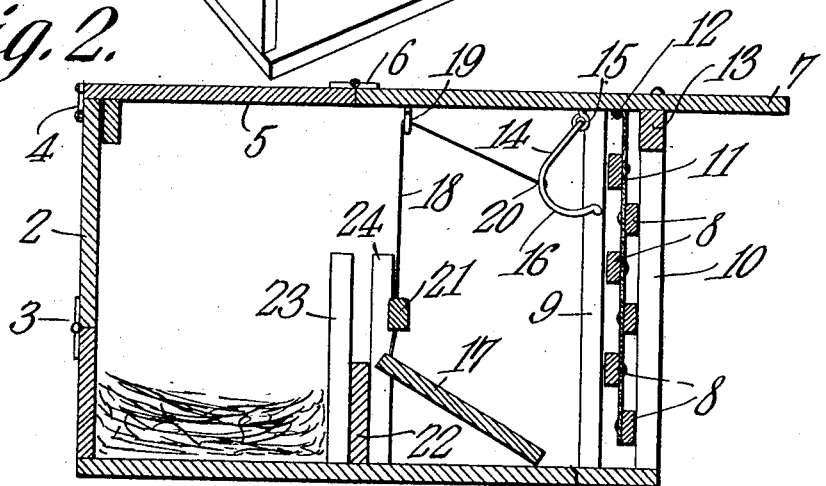
WITNESSES:
Carl P. Walls,
INVENTOR.
ATTORNEYS

UNITED STATES PATENT OFFICE.

CARL P. WALLS, OF MITCHELL, INDIANA, ASSIGNOR OF ONE-THIRD TO HAYDEN H. WALLS AND TWO-THIRDS TO WILLIAM S. HOLCOMBE, OF BEDFORD, INDIANA.

TRAP-NEST.

No. 892,339.   Specification of Letters Patent.   Patented June 30, 1908.

Application filed April 4, 1907.   Serial No. 366,383.

*To all whom it may concern:*

Be it known that I, CARL P. WALLS, a citizen of the United States, residing at Mitchell, in the county of Lawrence and State of Indiana, have invented a new and useful Trap-Nest, of which the following is a specification.

My present invention relates to improvements in trap nests, and it has for its object to provide a device of this character having a door or barrier that is released automatically to entrap a hen or other fowl entering the nest and insure entrapping without liability of injuring her, and insuring the entrance of not more than one fowl at a time, the releasing devices for the door or barrier being so constructed that the fowl cannot enter the nest without actuating them, and the trap being provided with suitable means for permitting access to the trap to remove the fowl therefrom.

To these and other ends, the invention consists in certain improvements and combinations and arrangements of parts, all as will be hereinafter more fully described, the novel features being pointed out particularly in the claims at the end of the specification.

In the accompanying drawings, Figure 1 is a view in perspective showing a trap nest constructed in accordance with the present invention, parts being broken away to show the interior arrangement of the parts. Fig. 2 represents a vertical section of the nest. Fig. 3 is a perspective view of a corner of the nest showing the devices for fastening the cover in place.

Corresponding parts in the several figures are indicated throughout by similar characters of reference.

The trap nest shown in the present embodiment of my invention consists of a box or casing 1 composed of wood or other suitable material and of appropriate dimensions, one end of the box being provided with a door opening of a size sufficient to admit a fowl, while the opposite end is provided with a door 2 hinged to the box at 3 and normally secured in closed position by means of a catch 4. The top of the box is closed by a lid 5 hinged to one edge of the top by means of hinges 6, and this lid is preferably provided with a ledge 7 projecting forwardly a sufficient distance beyond the door opening of the box and adapted to provide a rest for the fowls when the nests are superposed, the ledge of one box or nest providing a rest for the fowl entering the door opening of the nest next above it, and the lid, as well as the door 2, is preferably capable of being opened in order that access may be had to the nest whether the nests are used singly or in tiers.

In the front of the box or receptacle is arranged the door or barrier for entrapping the fowl after entering the nest, the door employed in the present instance embodying a plurality of horizontally arranged strips or slats 8 arranged to operate vertically between the forward and rear guides 9 and 10 arranged at each side of the door opening, and these slats are connected by one or more flexible tapes 11, the latter being secured at 12 to the lid in rear of a bar 13 extending transversely across the top of the door opening, and the tape being preferably connected alternately to the front and rear surfaces of the respective slats in order to insure a central arrangement of the slats between the guides, the slats at one side of the tape balancing those at the opposite side. The slats thus connected form a flexible blind having a normal tendency to fall and close the door opening, the guides coöperating with the slats to prevent exit of the fowl after it has been entrapped, but when the trap is set, the slats occupy a folded relation similar to that shown in Fig. 1, thereby uncovering the door opening and permitting entrance of the fowl to the nest. This door or barrier is preferably released automatically as the fowl enters the nest, and the devices for accomplishing this purpose embody, in the present instance, a hook 14 pivoted to the staple 15 and having a curved end 16 adapted to swing into and out of the path of the flexible blind, the hook when in folded position serving to engage beneath and support the flexible blind in elevated or open position. The devices for releasing the hook when the fowl enters the nest embody in the present instance a tread board 17 resting at its forward end on the floor of the trap and inclined so as to permit a vertical movement at its rear end. The retaining hook is operatively connected to this tread board by means of a pair of vertically extending wires 18, the latter passing through staples 19 secured to the top of the box and connected at 20 to the rear of the retaining hook, and on these wires is preferably provided a trip bar 21 arranged a suitable distance above the rear edge of the tread board 17, the purpose of the trip bar being to provide a rest or obstruction in front of the nest that the fowl will naturally jump upon in entering the nest, in case it does not use the tread board as an approach. In either case, the weight of the fowl on these parts will subject the wires 18 to sufficient tension to withdraw the hook from the flexible blind and the latter will fall under the influence of gravity to close the door opening and thus prevent exit of the fowl entrapped, as well as to prevent more than one fowl occupying the nest at a given time.

It will be understood, of course, that the present invention is not limited to the exact form of door or barrier shown, although it is particularly advantageous to employ a flexible blind, for the reason that it is very light in weight and is not liable to injure the fowl in case it should be released before the fowl had fully entered the trap, and while in set position it is folded very compactly, so that not only is it unnecessary to form an opening in the top of the nest for the bar to extend through when opened, but it also enables the nests to be superposed without interfering with their respective doors.

The nest is arranged preferably in the rear part of the box or at a point sufficiently removed from the door opening as to permit releasing of the door or barrier before the fowl enters the nest, and it is separated from the entrance to the trap by the front board 22 arranged in rear of the tread board and held in place by the vertically arranged stops 23 and 24, the stop 24 resting immediately in rear of and coöperating with the trip bar to retain it in operative position in front of the nest.

A trap nest embodying my present invention may be constructed cheaply and is easy to handle and keep clean and of course may be made in various sizes as may be desired, and they operate with certainty to trap the fowl seeking to enter the nest, the improved form of door or barrier being very compact when in open position, operating with certainty, and is so light and flexible that it cannot injure the fowl being trapped, and the trap may be readily cleaned, as the hooks or other securing means 25 for fastening the cover of the box in place may be readily unhooked, and as the flexible door, the tread board, and the trip bar are all carried by the cover, lifting of the cover will serve to withdraw these parts from the box, enabling these parts, as well as the box, to be easily and thoroughly cleaned.

What is claimed is:—

1. The combination with a receptacle having a door opening therein, and vertical guides on each side of said opening, of a flexible blind arranged to operate vertically between said guides, means for locking the flexible blind in open position, a tread board, and a flexible connection between the locking means and tread board.

2. The combination with a receptacle having a door opening therein, and vertically arranged guides at each side of the door opening, of a door embodying a plurality of horizontally arranged slats, and a flexible tape connecting them and having its upper end attached above the door opening, a hook pivoted to the receptacle and coöperating with the slats to retain the door in open position, and devices operatively connected to the said hook and operated by the fowl in entering the nest for releasing the door.

3. The combination with a receptacle having a door therein normally operating to close, of a hook pivoted in the upper part of the receptacle for retaining the door in open position, a tread board arranged in the receptacle behind the door, flexible connections between the said tread board and the retaining hook and a horizontal tread bar arranged above the tread board and attached to the flexible connections.

4. The combination with a receptacle having a vertically movable flexible blind therein for controlling exit therefrom, of a hook pivoted in the upper portion of the receptacle and coöperating with said blind to normally retain it in open position, a tread board arranged in the receptacle and in rear of the blind, wires having vertically extending portions connected to the tread board and leading to the top of the receptacle, guides for the wires at the top of the box, and horizontally extending portions of the wires extending from the guides to the retaining hook.

5. The combination with a receptacle, and a door mounted therein, of a device for normally retaining the door in open position, and releasing devices for the door embodying a tread board mounted in the receptacle and in rear of the door, a trip bar mounted above the tread board, and means for operatively connecting the tread board and trip bar to the door retaining device.

6. The combination with a receptacle having a nest therein and an opening communicating therewith, and a door for controlling the opening communicating with the nest, a pair of vertically extending stops at the sides of the receptacle between the nest and door, and a front board fitted between said stops, of a device for retaining the door in open position, a flexible operating connection attached to said door retaining device, and a horizontally extending trip bar arranged in front of the nest and connected to said flexible operating connection, said bar coöperating with one of the said stops for holding the said bar in operative position.

In testimony that I claim the foregoing as my own, I have hereto affixed my signature in the presence of two witnesses.

CARL P. WALLS.

Witnesses:
GEORGE W. WALLS,
J. F. WALLS.